No. 688,706. Patented Dec. 10, 1901.
J. M. SIGAFUS.
NUT LOCK.
(Application filed June 15, 1901.)
(No Model.)

Witnesses
Harry L. Amer.
B. Shrick.

Inventor
James M. Sigafus.
By Victor J. Evans.
Attorney

THE NORRIS PETERS CO., PHOTO-LITHO., WASHINGTON, D. C.

UNITED STATES PATENT OFFICE.

JAMES M. SIGAFUS, OF PERRIS, CALIFORNIA.

NUT-LOCK.

SPECIFICATION forming part of Letters Patent No. 688,706, dated December 10, 1901.

Application filed June 15, 1901. Serial No. 64,721. (No model.)

*To all whom it may concern:*

Be it known that I, JAMES M. SIGAFUS, a citizen of the United States, residing at Perris, in the county of Riverside and State of California, have invented new and useful Improvements in Nut-Locks, of which the following is a specification.

This invention relates to nut-locks, the object in view being to provide in connection with a threaded bolt and nut novel means for effectively securing the nut on the bolt, so as to prevent the same from turning and working loose.

The nut-lock contemplated in this invention is of such construction that when the nut is screwed up tight on the bolt it will be prevented from turning in either direction, and thereby moving either toward or away from the surface against which the nut bears. At the same time when occasion requires the nut may be taken off of the bolt without destroying or injuring the members which form the locking means.

With the above objects in view the invention consists in a nut-lock embodying certain novel features and details of construction and arrangement of parts, as hereinafter fully described, illustrated, and claimed.

Figure 1:
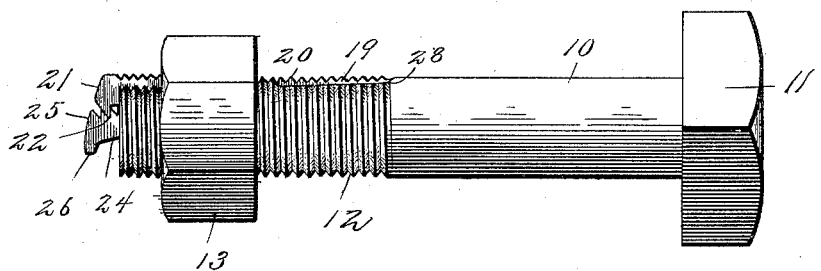
Figure 2:
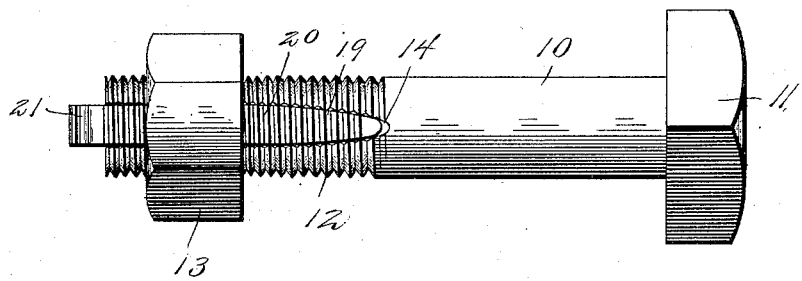
Figure 3:
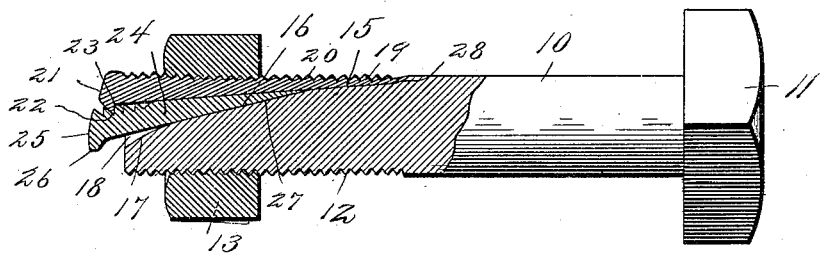
Figure 4:
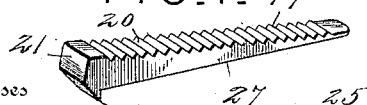
Figure 5:
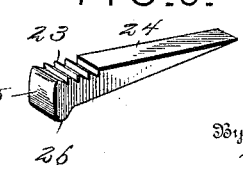

In the accompanying drawings, Figure 1 is a view in elevation of a bolt and nut having associated therewith the nut-locking elements of this invention. Fig. 2 is a similar view taken at right angles to Fig. 1. Fig. 3 is a longitudinal section through the same, showing the nut locked on the bolt. Fig. 4 is a detail perspective view of the threaded key. Fig. 5 is a similar view of the wedge.

Like numerals of reference designate like parts in all the views.

In the drawings, 10 designates a bolt provided with the usual head 11 and threads 12, while 13 represents a nut of ordinary construction adapted to be screwed thereon.

In carrying out the present invention the threaded portion of the bolt is provided with a groove or key-seat 14, extending longitudinally thereof and provided with an inclined floor or base, as best illustrated in Fig. 3. The inclination of the base of the groove is somewhat irregular, comprising three portions of different inclinations or pitches. The inner portion of the floor or base of the groove is only slightly inclined, as shown at 15, to correspond with the inclination of the inner surface of the taper key. (Illustrated in Fig. 4 and hereinafter described.) The central portion of the base of the groove (indicated at 16) is pitched at a greater angle to approximately correspond to the inner surface of the wedge. (Shown in Fig. 5 and hereinafter described.) The outer portion 17 of the base of the groove is pitched at a still greater angle to leave a space 18 under the wedge, so as to enable the outer portion of the wedge to give toward and away from the key, for a purpose which will appear.

The taper key 19 is provided on its outer surface with threads 20, corresponding with the threads 12 of the bolt, and is provided at its outer end with a head 21, adapted to receive the impact of a hammer and provided with a spur or tooth 22, which is adapted to engage with any one of a series of notches 23, formed in the corresponding outer end of a wedge 24.

The wedge 24 is, like the taper key 19, provided with an impact-head 25 and an offset or lip 26, the latter being provided in order to enable the point of a screw-driver or other instrument to be inserted behind the lip for extracting or forcing outward the wedge, thereby releasing the taper key. The opposite or inner and outer surfaces of the wedge 24 are smooth, as clearly illustrated in Figs. 3 and 5, while the inner surface 27 of the key is also smooth, as illustrated in the same figures, thus enabling the wedge to be driven inward and withdrawn when the spur 22 is disengaged from the notches 23.

The nut is first screwed upon the bolt to its final position and the taper key is then inserted in the manner illustrated in the drawings, so as to occupy a portion of the groove in the bolt and so that the threads 20 thereof will engage the internal threads of the nut, as shown in Fig. 3. The wedge is then driven beneath the key, as illustrated in the same figure, the spur 22 successively engaging the notches 23 until the wedge has been driven home. Both the key and wedge are to a certain extent flexible, so as to admit of an effective engagement between the spur and notches and so that after the key and wedge have been introduced into the groove one or both of said members may be forced or bent toward each other until the spur and notches are positively engaged, the key thus serving to hold the wedge in place and prevent it from being jarred loose. The wedge operates to slightly bend outward the outer end of the key, and thus avoids any possibility of the nut working outward toward the end of the bolt. The outward pressure of the key against the threads of the nut serves also as an efficient lock for the nut and prevents the same from turning. That portion of the key which extends inward from the nut is provided with an inclined extremity, as shown at 28, which bears against an inclined shoulder 29 at the inner end of the groove 14, so that by primarily forcing the key inward the inner extremity of said key will be deflected outward away from the center of the bolt, thereby giving an inclination to the inner portion of the key, which will prevent the nut from working inward on the bolt, and in this way the nut is prevented from working in either direction, even should it be loose enough to turn partially on the bolt. The space 18, as previously stated, admits of the outer portion of the wedge being bent so as to disengage it from the spur or tooth 22 of the key for the purpose of allowing the wedge to be inserted and withdrawn.

Having thus described the invention, what is claimed, and desired to be secured by Letters Patent, is—

1. A bolt having a groove extending lengthwise of its threaded portion and provided with an inclined base or floor; in combination with a nut, an exteriorly-threaded taper key removably inserted in said groove and provided at its outer end with a spur, and a wedge insertible between the key and base of the groove and provided at or near its outer end with notches to engage with the spur on the key.

2. A bolt provided with a longitudinal groove in its threaded portion terminating at the inner end in an inclined shoulder; in combination with a nut, a taper key exteriorly threaded and having its inner extremity inclined to coöperate with said inclined shoulder, the key being further provided at or near its outer end with a spur, and a wedge insertible between the taper key and base of the groove and provided with notches with which the spur on the key is adapted to engage.

3. A bolt provided with a groove extending longitudinally of the threaded portion thereof and having an inclined floor and a flared outer portion; in combination with a nut, an exteriorly-threaded taper key insertible in said groove and provided at or near its outer end with a spur, and a wedge insertible between the key and base of the groove and provided at or near its outer end with notches for engagement with the spur on the key.

In testimony whereof I affix my signature in presence of two witnesses.

JAMES M. SIGAFUS.

Witnesses:
ELNATHAN GARDNER,
JOHN MACARTHUR.